(12) United States Patent
Noble et al.

(10) Patent No.: US 8,751,590 B2
(45) Date of Patent: Jun. 10, 2014

(54) METHOD AND SYSTEM FOR MANAGING A VIRTUAL ACTIONABLE CONVERSATION

(75) Inventors: Jason Noble, Huntington Beach, CA (US); Jesse A. Ezell, Irvine, CA (US)

(73) Assignee: Neudesic, LLC, Irvine, CA (US)

(*) Notice: Subject to any disclaimer, the term of this patent is extended or adjusted under 35 U.S.C. 154(b) by 31 days.

(21) Appl. No.: 13/211,176

(22) Filed: Aug. 16, 2011

(65) Prior Publication Data

US 2013/0046822 A1    Feb. 21, 2013

(51) Int. Cl.
*G06F 15/16* (2006.01)
*H04L 29/06* (2006.01)
*H04L 12/58* (2006.01)

(52) U.S. Cl.
CPC .................. *H04L 65/403* (2013.01); *H04L 51/046* (2013.01)
USPC .......................................... 709/206; 709/204

(58) Field of Classification Search
CPC .......................... H04L 65/403; H04L 51/046
USPC ................................................... 709/204, 206
See application file for complete search history.

(56) References Cited

U.S. PATENT DOCUMENTS 8,014,756 B1 * 9/2011 Henderson .................... 455/411

\* cited by examiner

*Primary Examiner* — Hee Soo Kim
(74) *Attorney, Agent, or Firm* — Vista IP Law Group LLP

(57) ABSTRACT

A social activity stream application for managing virtual actionable conversations allows participants in a conversation to request actions to be performed in various external systems. A request to perform an action in an external system is received from a conversation participant, and sent to the external system, in which the requested action may then be performed. In this manner, conversation participants may use a single application to monitor and request actions in multiple external systems.

19 Claims, 5 Drawing Sheets

METHOD AND SYSTEM FOR MANAGING A VIRTUAL ACTIONABLE CONVERSATION

FIELD OF THE INVENTION

The invention relates to methods and systems for managing virtual actionable conversations related to events and/or activities that occur within external systems. The invention further relates to methods and systems for causing actions within the external systems based on action requests that occur during the conversations.

BACKGROUND

Enterprise software to manage workflow within a business enterprise is generally well-known in the art. More recently, social networking has become a popular way for people to communicate and keep in touch with one another outside of a business environment. But many of the features and advantages of social networking have not yet been efficiently integrated into a business environment.

For example, social networking services are online, internet-based services in which users can create a profile and link to other users, thereby creating a social network. Through the social networking service, users are able to quickly share information with others in their network. Users are able to have virtual conversations using the social networking service, in which a user posts a comment, and others within the network respond to the comment. In this manner, the exchange of information between members of a social network is extremely convenient.

Enterprise software, on the other hand, is generally used to manage workflow within a business enterprise for facilitating collaboration between employees and for coordinating business processes. Using such systems, employees are able to share documents, access information, review documents, approve projects, manage and track tasks, etc. Such systems are typically accessed through a user interface, such as a web-based application accessed through a browser.

But there is no system known to the inventors of the present invention in which the conversation management associated with social networking is efficiently integrated with the business project management features associated with enterprise software, such that a business system communicating with the enterprise software performs actions based on requests initiated from participants via a virtual conversation taking place outside of the business system. We call this type of conversation a virtual actionable conversation, since the conversation takes place over a network, and allows participants to request actions to be performed in a system external to the conversation. It is desirable to merge the features of social networking with the features of enterprise software to facilitate such virtual actionable conversations.

SUMMARY

A social activity stream application for managing virtual actionable conversations allows users, or subscribers, of the application to request actions to be performed in various external systems without having to access each of the external systems separately. A request to perform an action in an external system is received from a conversation participant, and sent to the external system, in which the requested action may then be performed. In this manner, conversation participants may use a single application to monitor and request actions in multiple external systems.

In accordance with a first aspect of the present inventions, a method of managing a virtual actionable conversation between a plurality of subscribers is provided. The method includes steps of: receiving, via a computer network, notice of an occurrence of an event in an external system; determining the event meets a threshold requirement; creating an electronic activity record corresponding to the event; identifying subscribers associated with the event, the subscribers comprising a first subscriber; sending, to the subscribers over the computer network, information corresponding to the activity record; and receiving, from the first subscriber over the computer network, in response to the information sent, a request for a data feed. The method may further include receiving, from a second subscriber, over the computer network, a request for the data feed.

In accordance with the first aspect of the present inventions, the method also includes sending the data feed over the computer network to the first subscriber, the data feed comprising 1) the information corresponding to the activity record and 2) an action link for requesting an action to be performed in the external system. The action link may be related to the event.

In accordance with the first aspect of the present inventions, the method further includes: receiving, over the computer network, an indication that the action link was activated by the first subscriber; sending, in response to the indication, a request to the external system to perform the action; receiving data from the external system confirming the action was performed in response to the request sent to the external system; and updating the activity record to reflect the action was performed. The method may also include sending, via the computer network, an updated data feed to the first subscriber, the updated data feed including information corresponding to the updated activity record.

In accordance with a second aspect of the present inventions, a system for managing a virtual actionable conversation between a plurality of subscribers is provided. The system includes: a server, a computer network, and a client computer in electronic communication with the server through the computer network. The server is programmed to perform the steps recited above. The client computer may be a mobile device.

In accordance with a third aspect of the present inventions, a method of managing a virtual actionable conversation between a plurality of subscribers is provided. The method includes monitoring, via a computer network, activities occurring in an external system, the activities comprising a first activity. The external system may be at least one of: an enterprise resource planning system; a customer relationship management system; an accounting system; a travel system; an expense reporting system; a timekeeping system; a human resources system; and a workflow management system. The method may further include monitoring activities occurring in a second external system.

In accordance with the third aspect of the present inventions, the method further includes determining the first activity meets a threshold requirement; creating an activity record associated with the first activity; and associating an action link with the activity record, wherein activation of the action link initiates a request for an action to be performed in the external system. The action link may be a link configured to cause at least one of the following actions to be performed in the external system: approve; reject; accept; reassign; share; and complete. The method may also include associating a second action link with the activity record. The method may include determining which one of a plurality of action links to associate with the activity record.

Still further, in accordance with the third aspect of the present inventions, the method includes routing, through the computer network, the activity record and the associated action link to a first subscriber for display. The method may include a step of determining the first subscriber is associated with the first activity. This determination may be based at least in part on input from the first subscriber. The input from the first subscriber may include at least one of: identification of an external system in which the first subscriber is interested; identification of an external system event in which the first subscriber is interested; and an event associated with one or more of the other subscribers.

In accordance with the third aspect of the present inventions, the method further includes determining the first subscriber activated the action link; and routing to the external system, through the computer network, a request for the action to be performed by the external system. The method may include creating a uniquely identifiable data structure associated with the first activity. Routing the request to the external system may thus include attaching the request to the uniquely identifiable data structure.

In accordance with a fourth aspect of the present inventions, a method of using a system for managing a virtual actionable conversation between a plurality of subscribers is provided. The method includes providing subscription parameters to a server to create a subscription to the system; receiving, through a user interface, a data feed tailored to the parameters, the data feed including an action link for causing an action to occur in an external system; activating the action link; and receiving, from the server, an updated data feed reflecting the action was performed by the external system. At least part of the method may include using a mobile device.

The above exemplary methods and systems allow users to request actions to be performed in multiple external systems. In this manner, such methods and systems may increase employee efficiency and productivity because employees are able to monitor activities and events and request actions in several external systems through a single application that is in communication with those external systems.

BRIEF DESCRIPTION OF THE DRAWINGS

The foregoing and other aspects of embodiments are described in further detail with reference to the accompanying drawings, wherein.

DETAILED DESCRIPTION OF ILLUSTRATED EMBODIMENTS

An Actionable Conversation System (ACS) enables users to act on virtual conversations resulting in the initiation, continuation, or completion of business processes within one or more external systems. These business processes could have been initiated, continued, or completed in each of the one or more external systems separately. Thus, the ACS is a convenient way for a user to interact with several external systems through a single application.

Figure 1:
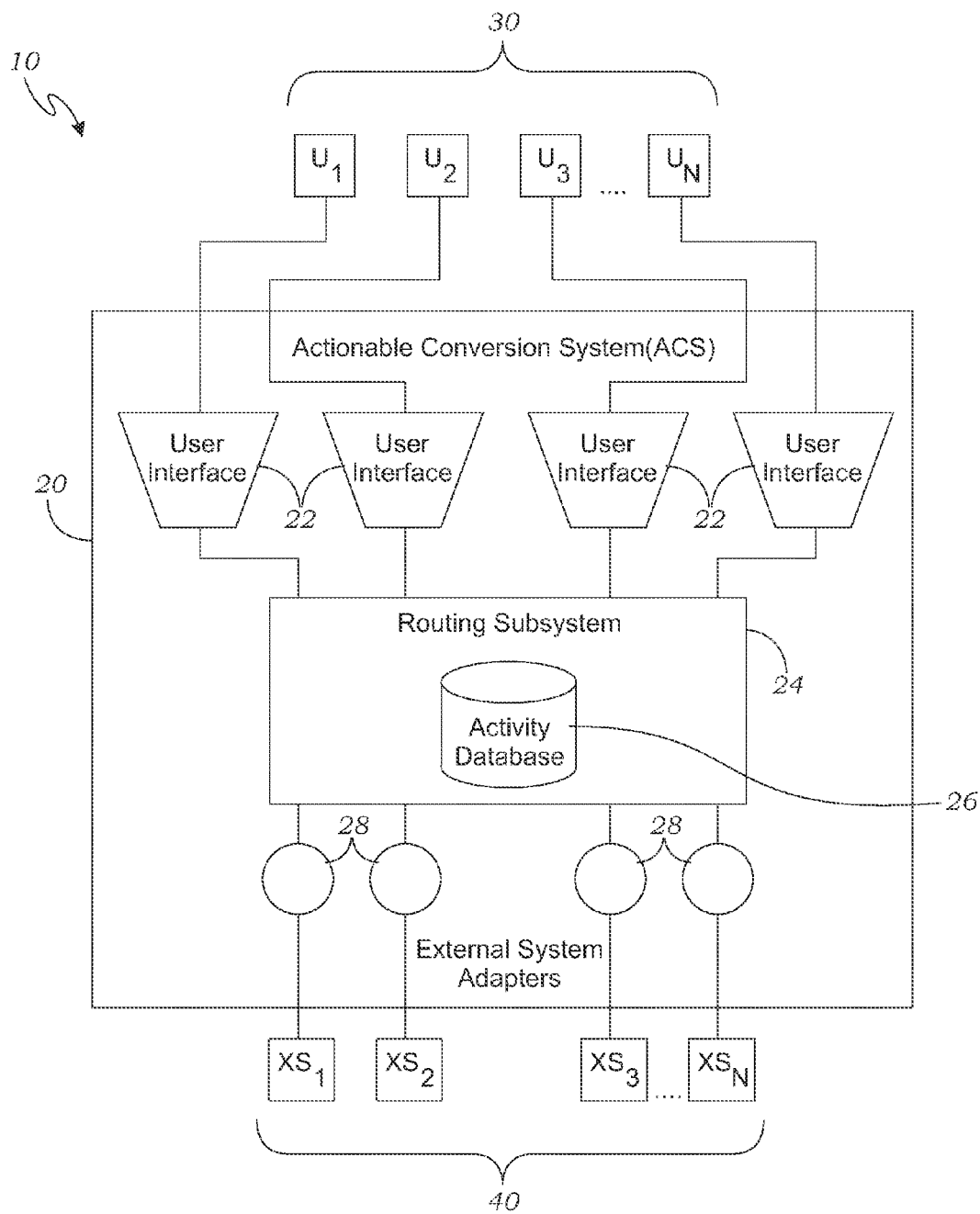
FIG. 1 is a block diagram of a system used to implement an embodiment of the present invention.

A system 10 including the ACS 20 is depicted in FIG. 1. The ACS 20 is in communication with a plurality of users 30 ($U_1, U_2, U_3 \ldots U_N$), and a plurality of external systems 40 ($XS_1, XS_2, XS_3 \ldots XS_N$). It should be well understood that the system 10 may include any number of users 30, including only one user. Similarly, the system 10 may include any number of external systems 40, including only one external system. The ACS 20 and the external systems 40 may be installed on a server 90 and accessed via a company's network 70 (shown in FIG. 1A). The users 30 may be the employees of the company, or other authorized users.

The external systems 40 may be business enterprises that are used by the company. For example, the external systems 40 may include accounting systems, expense reporting systems, travel systems, customer relationship management systems, timekeeping systems, enterprise resource planning systems, workflow management systems, human resources systems, or the like.

The ACS 20 includes a user interface 22 associated with each user 30, a routing subsystem 24, an activity database 26, and an external system adapter 28 associated with each external system 40. A user 30 accesses the ACS 20 using a client computer 80 (shown in FIG. 1A) configured to display the user interface 22. The client computer 80 may be a desktop computer or a mobile device, such as a laptop computer, smart phone, PDA, electronic tablet, netbook, mobile internet device, ultra-mobile PC, or the like. One of the advantages of the ACS 20 is that a user 30 is able to access all of the external systems 40 on a mobile device by using the ACS 20. Thus, even though the external systems 40 may not be directly accessible via a mobile device, a user is able to monitor each of the external systems 40 by accessing the ACS 20 via a mobile device.

The user interface 22 makes action links available to a user 30 within a conversation. The ACS 20 determines which action links are appropriate for the conversation and the user interface 22 displays those action links to the user 30. The user interface 22 is configured such that the user 30 is able to select/activate one of the displayed action links. For example, the user 30 may click on a desired action link using a mouse, stylus, touch screen, or the like. In response to the user's selection/activation of one of the action links, the user interface 22 may provide an indication of which action link was selected/activated. For example, the user interface 22 may highlight a radio button next to the selected/activated action link, change the color of the text of the selected/activated action link, highlight the text of the selected/activated action link, or the like.

Figure 2A:
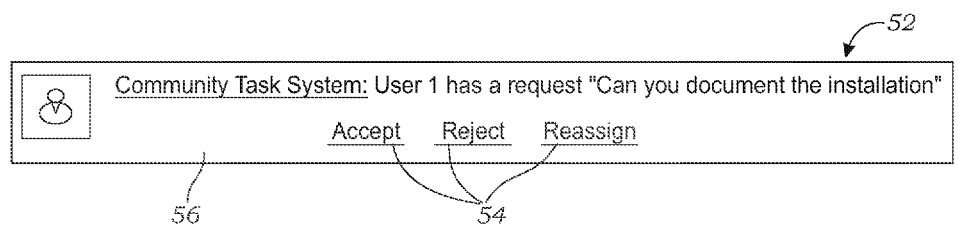
FIGS. 2A and 2B illustrate exemplary user interfaces that could be used with the system of the present invention.
Figure 2B:
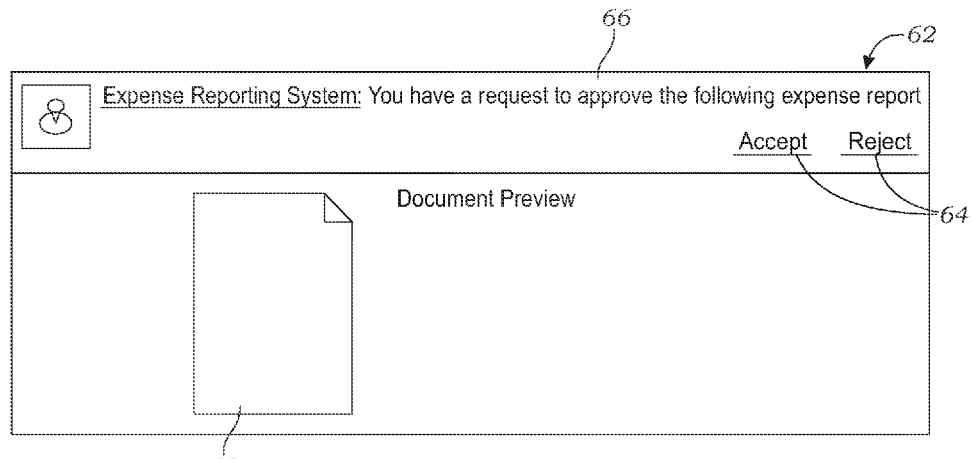

Examples of user interfaces are shown in FIGS. 2A and 2B. The user interface 52 depicted in FIG. 2A includes a comment 56 and three options of action links 54 that the user viewing the user interface 52 may choose. In particular, the user viewing the user interface 52 may choose "accept," "reject," or "reassign."

The user interface 62 depicted in FIG. 2B includes a comment 66, two options of action links 64 that the user viewing the user interface 62 may choose, and a preview of a document 68 attached to the conversation. In this example, the user viewing the user interface 62 may choose either "approve" or "reject."

Referring back to FIG. 1, the routing subsystem 24 of the ACS 20 routes actions from either the user interface 22 or external systems 40 to the appropriate end point. An end point may be an external system 40, or a user 30. For example, if one of the users 30 initiates an action by selecting one of the action links in the user's corresponding user interface 22, the routing subsystem 24 determines which of the external systems 40 the initiated action corresponds to. The routing subsystem 24 then routes the action to the appropriate external system 40.

The activity database 26 stores all conversations, whether the conversation is actionable or not. Any activity that has occurred or is pending in the ACS 20 is stored in the database 26. The activity database 26 also stores the necessary information needed to route actions between endpoints. For example, in order to determine which of the external systems 40 an initiated action corresponds to, the routing subsystem 24 may access information stored in the activity database 26. The activity database 26 may also keep track of which user 30 initiated each action.

The external system adapters 28 receive and send actions to external systems 40. The external system adapters 28 translate data to and from the format required by the external systems 40. Each of the external systems 40 communicates with the ACS 20 through its own external system adapter 28. In this manner, each of the external system adapters 28 is customized to communicate with their respective external systems 40. For example, if one of the external systems 40 is an accounting system, the external system adapter 28 corresponding to the accounting system is configured to facilitate communication from the ACS 20 to the accounting system by translating data from the ACS format to the format required by the accounting system. Similarly, an external system adapter 28 corresponding to a travel system facilitates communication from the travel system to the ACS 20 by translating data from the travel system format to the ACS format. More specifically, the external system adapters 28 facilitate communication between the application programming interface (API) of the ACS 20 and the APIs of the external systems 40.

An actionable conversation can be manually initiated by a user 30 or automatically initiated by the ACS 20. When an event or activity in one of the external systems 40 is detected, and the ACS 20 determines that the event or activity warrants a conversation, the ACS 20 will call the API to initiate a conversation. The conversation includes supporting information about the source of the event or activity so that the event or activity can be identified in the ACS 20. Supporting information may include, for example, one or more of the following: the name of the external system in which the event or activity occurred, a record ID number of the event or activity, the type of event or activity, names of users associated with the event or activity (e.g., the name of a user that generated the event or activity), dollar amounts associated with the event or activity, or the like. Communication between the API and the external system 40 is facilitated by the external system adapters 28. Thus, the ACS 20 may automatically initiate a conversation without user intervention, and the conversation may be between a user 30 and an external system 40.

Figure 1A:
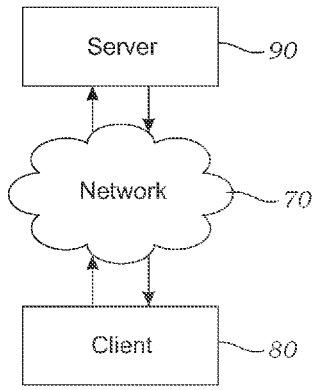
FIG. 1A is a high-level system diagram of a computer network used to implement an embodiment of the present invention.
Figure 3:
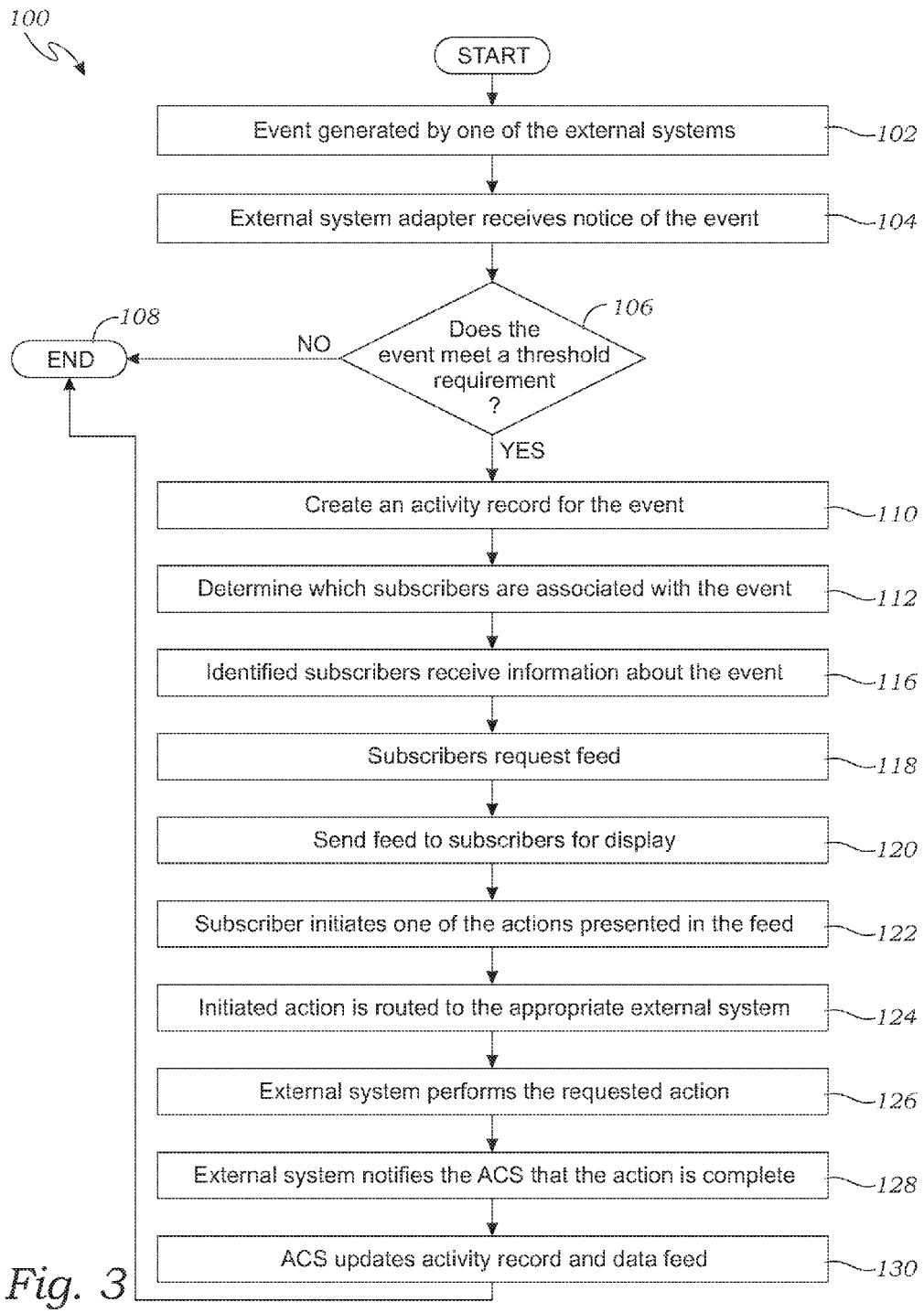
FIG. 3 is a flowchart illustrating a method in accordance with an aspect of the present invention.

An example of a method 100 of managing a virtual actionable conversation is depicted in FIG. 3. It should be well understood that communications between the external systems 40 and the ACS 20 and between the users 30 and the ACS 20 occur via the computer network 70 (see FIG. 1A). A client computer 80 is in communication with a server 90 through the computer network 70, as shown in FIG. 1A, and the ACS 20 and external systems 40 are installed on the server 90. In this manner, the server 90 is programmed to execute the steps of the method 100 depicted in FIG. 3.

First, in step 102, one of the external systems 40 generates an event. For example, the external system 40 may be an expense reporting system, and the event may be that the expense reporting system generated an expense report. In another example, the external system 40 may be a travel system, and the event may be that a new travel request has been created by a user of the travel system. In a still further example, the external system 40 may be a customer relationship management system, and the event may be that a new support request or access request has been created by a user of the customer relationship management system.

The ACS 20 may actively monitor events occurring in all of the external systems 40, and/or may be configured to receive notifications from external systems 40 as events occur. Thus, when the event is generated in step 102, the external system adapter 28 in the ACS 20 receives notice that the event has occurred (step 104). In particular, the external system adapter 28 that receives the notification is the external system adapter 28 that corresponds to the external system 40 that generated the event. Alternatively or additionally, the external system adapter 28 may detect the event.

After receiving the notice, the ACS 20 determines whether the event meets a threshold requirement (step 106). For example, the ACS 20 determines whether any of the users 30 are interested in, or need to be notified of, the event. In another example, if the ACS 20 determines that the event is actionable (e.g., that the event requires some further action to be performed in the external system 40), then the event meets a threshold requirement. In a specific example, if the event is an expense report generated by an expense reporting system, the ACS 20 may determine that one of the users 30 is responsible for approving or rejecting the expense report, and therefore, that the generated expense report meets a threshold requirement.

This determination in step 106 is based at least in part upon subscription parameters provided by each user 30, also referred to herein as "subscribers." Each subscriber 30 to the ACS 20 inputs subscription parameters to create a subscription to the ACS 20. For example, subscribers may input the identification of an external system in which the subscriber is interested, identification of an external system event in which the subscriber is interested, an event associated with one or more of the other subscribers, or the like. In a specific example, a user 30 that is responsible for approving travel requests may subscribe to the feed of the travel system, which is one of the external systems 40 in communication with the ACS 20. In another specific example, if user $U_1$ is user $U_2$'s supervisor, then user $U_1$ may subscribe to user $U_2$'s feed in order to monitor events and activities associated with user $U_2$. In general, if the characteristics of the event match at least one subscription parameter provided by at least one subscriber 30, then the event meets a threshold requirement.

If the event does not meet a threshold requirement, then a conversation is not initiated and the process ends at step 108. For example, if there is no required action associated with the event, or if the person required to perform a required action is not a subscriber to the ACS 20, then the event may not meet a threshold requirement.

If the event does meet the threshold requirement, then the method continues to step 110, where the ACS 20 creates an electronic activity record corresponding to the event. A uniquely identifiable data structure associated with the event may be created and included in the activity record. Each activity record has it's own uniquely identifiable data structure so that each activity record is uniquely identifiable. The uniquely identifiable data structure may also be referred to as a unique key, a globally unique identifier, a correlation identifier, or the like. This uniquely identifiable data structure is later used to submit a requested action back to the external system 40, as explained in more detail below.

The ACS 20 then determines, in step 112, which subscribers 30 are associated with the event. This determination in step 112 depends on whether a subscriber's subscription parameters match characteristics of the event. For example, if the event is the creation of a document that needs to be approved, the ACS 20 would determine that the subscriber required to approve the document is one of the subscribers associated with the event.

Next, in step 116 the ACS 20 sends, to the subscribers identified in step 112, information corresponding to the activity record. In response to this information, one or more of the subscribers 30 may send a request for a data feed in step 118. In response to this request from the subscriber 30, the data feed is sent to the subscriber 30 for display in step 120. Thus, the subscriber 30 receives, through the user interface 22, a data feed tailored to the subscription parameters that the subscriber 30 previously provided. For example, a user subscribed to the feed for the external system "travel" would receive a data feed that includes all of the events that occur within and in response to the "travel" system. The data feed includes the information corresponding to the activity record and may include at least one action link for requesting an action to be performed in the external system 40. The action link may be related to the event. The action links may be for requesting actions such as "approve," "reject," "reassign," "review," "submit," "assign," "complete," "accept," "share," or the like.

The external systems 40 determine which actions are available for a particular event. Based on this determination by the external systems 40, the external system adapters 28 or the API of the ACS 20 dynamically determine which action link(s) to associate with the activity record. For example, if the event is that a travel request has been received by a travel system, the external system adapter 28 or the API associated with the travel system would tell the ACS 20 that the available actions for this event are "approve," "reject," and "reassign." Thus, the ACS 20 is configured to associate "approve," "reject," and "reassign" action links with the travel request.

Then, in step 122, the subscriber 30 activates one of the action links presented in the data feed, and the ACS 20 receives, via the computer network, an indication that the action link was activated by one of the subscribers 30. The subscribers 30 may access their data feeds and select/activate a desired action using their desktop computer or a mobile device. This is significant because directly accessing individual external systems 40 and initiating desired actions in those external systems 40 may not be possible through mobile devices. That is, the ACS 20 makes it possible to initiate actions in external systems 40 by using a mobile device that, without the ACS 20, may not be capable of accessing the external systems 40.

The ACS 20 then sends a request to the appropriate external system 40 to perform the action by routing the initiated action through the external system adapters 28 to the appropriate external system 40 in step 124. The request may be attached to the uniquely identifiable data structure that was created and included with the activity record in step 110.

In step 126, the requested action is performed by the external system 40. The ACS 20 then receives data from the external system 40 in step 128, confirming the action was performed in response to the request sent to the external system 40. Finally, in step 130, the ACS 20 updates the activity record and the data feed to reflect that the action was performed. The updated data feed may then be sent, via the computer network 70, to the subscriber 30 that initiated the action. The updated data feed may include information corresponding to the updated activity record.

Figure 4:
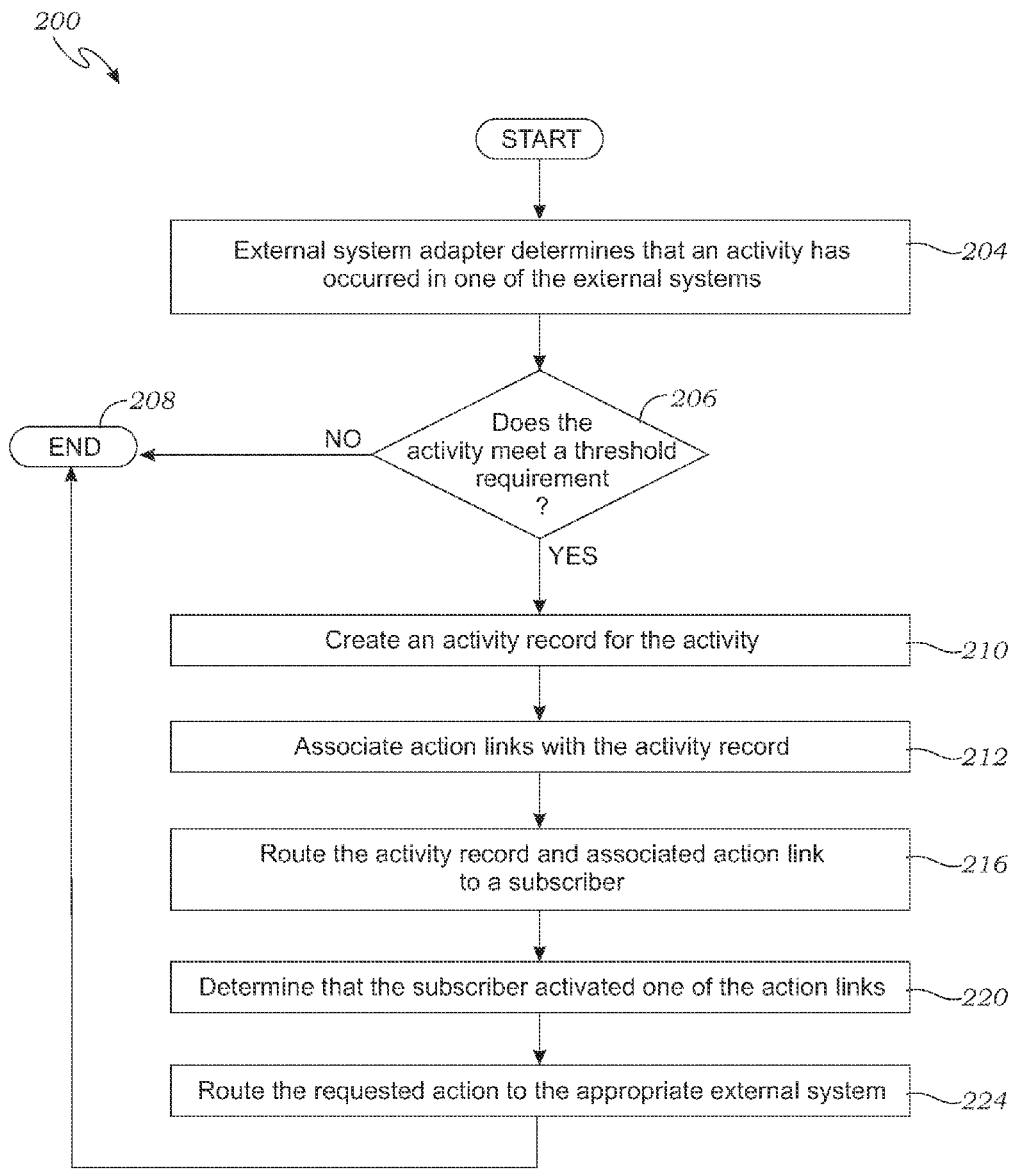
FIG. 4 is a flowchart illustrating a method in accordance with another aspect of the present invention.

Referring now to FIG. 4, another example of a method 200 of managing a virtual actionable conversation is depicted. In this embodiment, the data feed is automatically sent to the subscribers 30 based on the subscription parameters provided by the subscribers 30. In other words, the subscribers 30 do not receive information about an event and then request a data feed related to the event, as in steps 116 and 118 depicted in FIG. 3.

Similar to the method 100 described above, it should be well understood that, in the method 200 depicted in FIG. 4, communications between the external systems 40 and the ACS 20 and between the users 30 and the ACS 20 occur via the computer network 70. For example, the ACS 20 monitors activities and events occurring in the external systems 40 via the computer network 70. Alternatively or additionally, the ACS 20 may receive a notification via the computer network 70 of an activity or event that has occurred in one of the external systems 40.

The first step 204 in the method 200 depicted in FIG. 4 is that one of the external system adapters 28 determines (e.g., by monitoring, by receiving notification, or by some other method) that an activity has occurred in one of the external systems 40. For example, the external system 40 may be an expense reporting system, and the activity may be that the expense reporting system generated an expense report. In another example, the external system 40 may be a travel system, and the activity may be that a new travel request has been created by a user of the travel request system. In a still further example, the external system 40 may be a customer relationship management system, and the activity may be that a new support request or access request has been created by a user of the customer relationship management system.

Next, in step 206, the ACS 20 determines whether the activity meets a threshold requirement. For example, the ACS 20 determines whether any of the users 30 are interested in, or need to be notified of, the activity. In another example, if the ACS 20 determines that the event is actionable (e.g., that the event requires some further action to be performed in the external system 40), then the event meets a threshold requirement. In a specific example, if the activity is an expense report generated by an expense reporting system, the ACS 20 may determine that one of the users 30 is responsible for approving or rejecting the expense report, and therefore, that the generated expense report meets a threshold requirement.

This determination in step 206 is based at least in part upon the subscription parameters provided by each subscriber 30. The subscription parameters provided by each subscriber 30 are discussed in more detail above. In general, if the characteristics of the activity match at least one subscription parameter provided by at least one subscriber 30, then the activity meets a threshold requirement.

If the activity does not meet a threshold requirement, then a conversation is not initiated and the process ends at step 208. For example, if there is no required action associated with the activity, or if the person required to perform a required action is not a user 30 of the ACS 20, then the activity may not meet a threshold requirement.

If the activity does meet the threshold requirement, then the method continues to step 210, where the ACS 20 creates an electronic activity record corresponding to the activity. Similar to the method 100 previously discussed, a uniquely identifiable data structure associated with the activity may be created and included in the activity record.

In step 212, the ACS 20 associates at least one action link with the activity record. The procedure for determining which action link(s) to associate with the activity record is discussed in more detail above with reference to FIG. 3.

Next, in step 216, the activity record and the associated action link are routed to one or more subscribers 30. The ACS 20 determines which of the subscribers 30 should receive the activity record and associated action link based upon the subscription parameters previously provided by each subscriber 30. In general, if the characteristics of the activity meet at least one of the subscription parameters provided by a subscriber 30, then the ACS 20 determines that the subscriber 30 should receive the activity record and the associated action link. The activity record and associated action link may be displayed in the subscriber's data feed.

Then, in step 220, the ACS 20 determines that one of the subscribers 30 activated one of the action links presented in the data feed. The subscribers 30 may access their data feeds and select/activate a desired action using their desktop computer or a mobile device.

The ACS 20 then routes the requested action to the appropriate external system 40 through the corresponding external system adapter 28 in step 224. The request may be attached to the uniquely identifiable data structure that was created and included with the activity record in step 210.

Figure 5:
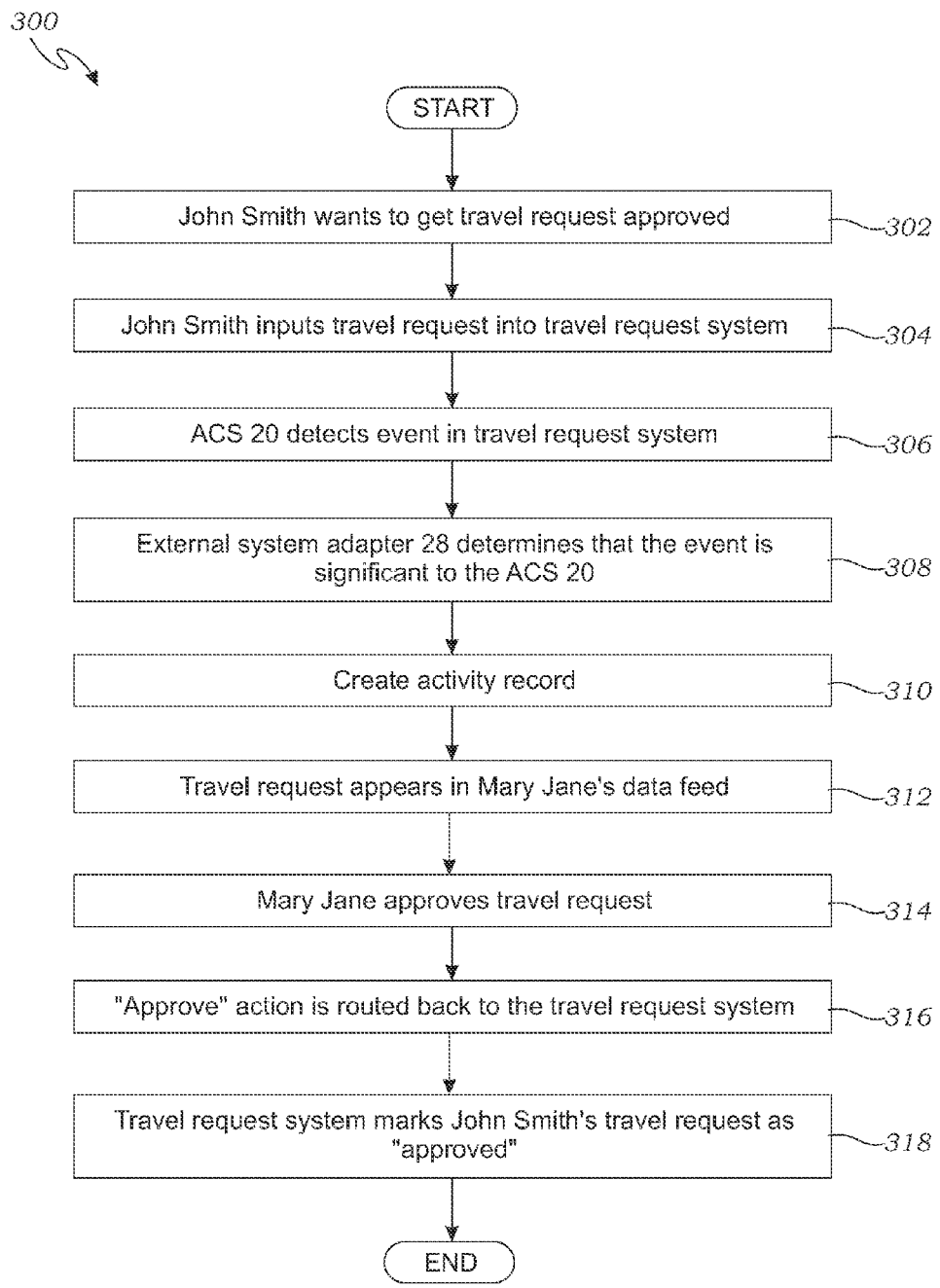
FIG. 5 is a flowchart illustrating a particular example of a virtual actionable conversation using the system of the present invention.

An example of a method 300 that takes place during a particular example of an actionable conversation is depicted in FIG. 5. First, at step 302, John Smith wants to get a travel request approved. At step 304, John Smith accesses the travel system and inputs his travel request into the travel system. The travel system is one of the external systems 40 in communication with the ACS 20. Thus, the external system adapter 28 corresponding to the travel system detects that a new travel request has been entered into the travel system at step 306. The external system adapter 28 also determines, at step 308, that this event is significant to the ACS 20 (i.e., that the new travel request entered into the travel system meets a threshold requirement). The external system adapter 28 of the ACS 20 then creates an activity record at step 310. The activity record is designated as a travel request for approval and includes a uniquely identifiable data structure. Because the activity record is designated as a travel request for approval, the ACS 20 dynamically associates the action links of "approve," "reject," and "reassign" with the activity record. Mary Jane is John Smith's manager, and therefore, is subscribed to John Smith's travel request approval feed. Thus, at step 312, Mary Jane will see this travel request on her data feed and can act on it. Because Mary Jane is presented with the action links and she approves of the request, she activates the "approve" action link in step 314. Significantly, Mary Jane is able to view her data feed and activate the desired action link via a mobile device. The "approve" action is routed back to the travel system through the corresponding external system adapter 28 of the ACS 20 at step 316. Finally, the original travel request is marked as "approved" in the travel system at step 318.

Mary Jane could also request actions in several other external systems through the ACS 20. For example, in addition to approving John Smith's travel request, Mary Jane could also review and approve/reject a budget report generated by an accounting system that is in communication with the ACS 20, reassign a task to another employee through a workflow management system that is in communication with the ACS 20, approve an order for new parts when inventory goes below a certain level through an enterprise resource planning system that is in communication with the ACS 20, and the like. In this manner, the ACS 20 is advantageous in that a user is able to communicate with and request actions in several external systems through the ACS 20 by accessing only the ACS 20. In other words, the user does not have to access each external system separately.

Although particular embodiments have been shown and described, it should be understood that the above discussion is not intended to limit the scope of these embodiments. Various changes and modifications may be made without departing from the scope of the claims. Thus, embodiments are intended to cover alternatives, modifications, and equivalents that fall within the scope of the claims.

What is claimed is:

1. A method of managing a virtual actionable conversation between a plurality of subscribers, comprising:
   receiving, via a computer network, notice of an occurrence of an event in a system external to a virtual actionable conversation system, wherein the virtual actionable conversation system is configured to enable a virtual conversation between the subscribers;
   determining the event meets a threshold requirement;
   creating an electronic activity record corresponding to the event;
   identifying subscribers associated with the event, the subscribers comprising a first subscriber;
   sending, to the subscribers over the computer network, information corresponding to the activity record via the virtual actionable conversation system within a virtual conversation between the first subscriber and one of the other subscribers;
   receiving, from the first subscriber over the computer network, in response to the information sent, a request for a data feed;
   sending the data feed over the computer network to the first subscriber, the data feed comprising 1) the information corresponding to the activity record and 2) an action link for requesting an action to be performed in the external system;
   receiving, over the computer network, an indication that the action link was activated by the first subscriber;
   sending, in response to the indication, a request to the external system to perform the action;
   receiving data from the external system confirming the action was performed in response to the request sent to the external system; and
   updating the activity record to reflect the action was performed.

2. The method of claim 1, further comprising sending, via the computer network, an updated data feed to the first subscriber, the updated data feed including information corresponding to the updated activity record.

3. The method of claim 1, further comprising receiving from a second subscriber, over the computer network, a request for the data feed.

4. The method of claim 1, wherein the action link is related to the event.

5. A method of managing a virtual actionable conversation between a plurality of subscribers, comprising:
   monitoring, via a computer network, activities occurring in a system external to a virtual actionable conversation system, wherein the virtual actionable conversation system is configured to enable a virtual conversation between the subscribers, the activities comprising a first activity;
   determining the first activity meets a threshold requirement;
   creating an activity record associated with the first activity;

associating an action link with the activity record, wherein activation of the action link initiates a request for an action to be performed in the external system;

routing, through the computer network, the activity record and the associated action link to a first subscriber for display via the virtual actionable conversation system within a virtual conversation between the first subscriber and one of the other subscribers;

determining the first subscriber activated the action link; and routing to the external system, through the computer network, a request for the action to be performed by the external system.

6. The method of claim 5, further comprising determining which one of a plurality of action links to associate with the activity record.

7. The method of claim 5, further comprising associating a second action link with the activity record.

8. The method of claim 5, further comprising monitoring activities occurring in a second external system.

9. The method of claim 5, further comprising creating a uniquely identifiable data structure associated with the first activity.

10. The method of claim 9, wherein routing the request to the external system comprises attaching the request to the uniquely identifiable data structure.

11. The method of claim 5, further comprising determining the first subscriber is associated with the first activity.

12. The method of claim 11, wherein determining the first subscriber is associated with the first activity is based at least in part on input from the first subscriber.

13. The method of claim 12, wherein the input from the first subscriber comprises at least one of: identification of an external system in which the first subscriber is interested; identification of an external system event in which the first subscriber is interested; and an event associated with one or more other subscribers.

14. The method of claim 5, wherein the external system is at least one of: an enterprise resource planning system; a customer relationship management system; an accounting system; a travel system; an expense reporting system; a timekeeping system; a human resources system; and a workflow management system.

15. The method of claim 5, wherein the action link is a link configured to cause at least one of the following actions to be performed in the external system:

approve; reject; accept; reassign; share; and complete.

16. A method of using a system for managing a virtual actionable conversation between a plurality of subscribers, comprising:

providing subscription parameters to a server to create a subscription to the system; receiving, through a user interface, a data feed tailored to the parameters, the data feed including an action link for causing an action to occur in a system external to a virtual actionable conversation system, wherein the virtual actionable conversation system is configured to enable a virtual conversation between the subscribers;

activating the action link via the virtual actionable conversation system within a virtual conversation between at least two of the other subscribers; and receiving, from the server, an updated data feed reflecting the action was performed by the external system.

17. The method of claim 16, wherein at least part of the method comprises using a mobile device.

18. A system for managing a virtual actionable conversation between a plurality of subscribers, comprising:

a server;

a computer network; and a client computer in electronic communication with the server through the computer network, wherein the server is programmed to:

receive notice of an occurrence of an event in a system external to a virtual actionable conversation system, wherein the virtual actionable conversation system is configured to enable a virtual conversation between the subscribers;

determine the event meets a threshold requirement;

create an electronic activity record corresponding to the event;

identify subscribers associated with the event, the subscribers comprising a first subscriber;

send, to the subscribers over the computer network, information corresponding to the activity record;

receive, from the first subscriber over the computer network, in response to the information sent, a request for a data feed via the virtual actionable conversation system within a virtual conversation between at least two of the other subscribers;

send the data feed over the computer network to the first subscriber, the data feed comprising 1) the information corresponding to the activity record and 2) an action link for requesting an action to be performed in the external system;

receive, over the computer network, an indication that the action link was activated by the first subscriber;

send a request to the external system to perform the action;

receive data from the external system confirming the action was performed in response to the request sent to the external system; and update the activity record to reflect the action was performed.

19. The system of claim 18, wherein the client computer is a mobile device.

* * * * *